United States Patent
Wittrock et al.

(10) Patent No.: US 9,061,245 B2
(45) Date of Patent: Jun. 23, 2015

(54) METHOD FOR REDUCING NITROGEN OXIDES IN DIESEL-ENGINE EXHAUST GASES AND EXHAUST GAS AFTERTREATMENT SYSTEM FOR CARRYING OUT THE METHOD

(71) Applicant: DEUTZ Aktiengesellschaft, Cologne (DE)

(72) Inventors: Meike Wittrock, Bergisch-Gladbach (DE); Wolfgang Beberdick, Leverkusen (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 14/328,243

(22) Filed: Jul. 10, 2014

(65) Prior Publication Data

US 2015/0023853 A1    Jan. 22, 2015

(30) Foreign Application Priority Data

Jul. 17, 2013    (EP) .................................... 13003608

(51) Int. Cl.

| | |
|---|---|
| *B01D 53/94* | (2006.01) |
| *F01N 3/035* | (2006.01) |
| *F01N 3/20* | (2006.01) |
| *F01N 3/023* | (2006.01) |
| *F01N 13/00* | (2010.01) |

(52) U.S. Cl.
CPC ............ *B01D 53/9454* (2013.01); *F01N 3/206* (2013.01); *F01N 3/2066* (2013.01); *F01N 3/023* (2013.01); *F01N 3/0231* (2013.01); *F01N 3/035* (2013.01); *F01N 2610/02* (2013.01); *F01N 2900/1616* (2013.01); *F01N 13/0093* (2014.06)

(58) Field of Classification Search
CPC .. B01D 53/94; B01D 53/9409; B01D 53/944; B01D 53/9477; F01N 3/035; F01N 3/2066
USPC ........... 423/213.2, 213.5, 213.7; 60/274, 299, 60/301
See application file for complete search history.

(56) References Cited

U.S. PATENT DOCUMENTS

| | | | |
|---|---|---|---|
| 8,544,260 B2 * | 10/2013 | Boorse et al. ................... | 60/299 |
| 2005/0284134 A1 | 12/2005 | Radhamohan et al. | |
| 2006/0057046 A1 | 3/2006 | Punke et al. | |
| 2006/0272317 A1 | 12/2006 | Brown et al. | |
| 2008/0041041 A1 | 2/2008 | Duesterdiek et al. | |
| 2008/0060348 A1 | 3/2008 | Robel et al. | |
| 2009/0035194 A1 | 2/2009 | Robel et al. | |
| 2009/0035195 A1 * | 2/2009 | Robel ........................... | 422/177 |
| 2011/0023463 A1 | 2/2011 | Dobson et al. | |
| 2011/0085954 A1 * | 4/2011 | Doring et al. .............. | 423/213.5 |

FOREIGN PATENT DOCUMENTS

| | | |
|---|---|---|
| DE | 10 2005 009 686 A1 | 9/2006 |
| DE | 10 2006 025 131 B4 | 12/2006 |
| DE | 10 2010 032 544 A1 | 2/2011 |

(Continued)

*Primary Examiner* — Timothy Vanoy
(74) *Attorney, Agent, or Firm* — Davidson, Davidson & Kappel, LLC

(57) ABSTRACT

An exhaust gas aftertreatment system, in particular for V-type diesel engines, is provided. The system includes, disposed in the exhaust line of the engine in the direction of the exhaust gas flow, a first SCR stage, a catalytically activated particulate filter (cDPF), a second SCR stage, and an ammonia slip catalyst (ASC). A method for purifying diesel engine exhaust gases containing hydrocarbons, carbon monoxide, soot particles, and nitrogen oxides consisting of NO and $NO_2$ is also provided.

6 Claims, 4 Drawing Sheets

(56) References Cited

FOREIGN PATENT DOCUMENTS

| | | |
|---|---|---|
| EP | 2 065 577 | 6/2009 |
| EP | 2 522 419 | 11/2012 |
| FR | 2 968 709 | 6/2012 |
| WO | WO 2014/016616 A1 * 1/2014 | ................ F01N 3/20 |

* cited by examiner

METHOD FOR REDUCING NITROGEN OXIDES IN DIESEL-ENGINE EXHAUST GASES AND EXHAUST GAS AFTERTREATMENT SYSTEM FOR CARRYING OUT THE METHOD

This claims the benefit of European Patent Application EP 13 003 608.0, filed Jul. 17, 2013 and hereby incorporated by reference herein.

BACKGROUND

The present invention relates to a method for reducing nitrogen oxides in diesel-engine exhaust gases, and to a device for carrying out the method of the present invention.

German Patent Application DE 10 2005 009 686 A1 discloses a method for treating exhaust gases from diesel engines, where the exhaust gas is passed through a regenerable particulate filter and a NO catalyst in the exhaust line. The exhaust gas is first passed through a urea-based selective catalytic reduction (SCR) $NO_x$ catalyst located near the engine, and subsequently through a CSF-type particulate filter (CSF=catalyzed soot filter). The energy necessary for regenerating the particulate filter is supplied to it from outside. Also described is an apparatus for treating exhaust gases from diesel engines, having a $NO_x$ catalyst of the urea SCR type located near the engine, a regenerable particulate filter of the CSF type downstream from the catalyst, and a device associated with the particulate filter for supplying the energy necessary to regenerate the same.

U.S. Patent Application U.S. 20050284134 A1 discloses an exhaust gas aftertreatment system that constitutes a multi-stage SCR catalyst system. This multi-stage SCR catalyst system has the feature that the main portion of the nitrogen oxides contained in the exhaust gas, namely 80-95% of the nitrogen oxides contained in the raw emissions of the vehicle, is removed by the first SCR stage in the direction of flow. The second SCR stage serves to complete the conversion of the nitrogen oxides. The second stage is operated with a sub-stoichiometric amount of ammonia in relation to the nitrogen oxide concentration in the exhaust gas in order to prevent the risk of ammonia slipping through the entire exhaust system.

German Patent Application DE 10 2010 032 544 A1 discloses an emission control system for an internal combustion engine including a reductant injector; a first SCR region positioned downstream of the reductant injector; a second SCR region positioned downstream of the first SCR region; and an electronic controller for: in a first mode, adjusting reductant injected based on an amount of stored reductant in the first SCR region; and in a second mode, adjusting reductant injected based on an amount of stored reductant in the second SCR region. Also disclosed is a method for controlling an emission control system having a first SCR region upstream of a second SCR region, the method including: in a first mode, adjusting an amount of reductant delivered upstream of the first SCR region based on a condition of the first SCR region; and, in a second mode, adjusting the amount of reductant delivered upstream of the first SCR region based on a condition of the second SCR region.

The amount of reductant required for the entire system is supplied through a single reductant injector, which is located upstream of the first SCR region.

German Patent DE 10 2006 025 131 B4 describes a diagnostic system for an exhaust gas aftertreatment system for treating an exhaust gas issuing from an engine, including: a downstream sensor that monitors a downstream temperature of the exhaust gas; a dosing system that selectively injects a dosing agent into the exhaust gas; and a control module that determines a temperature differential threshold based on an injected amount of the dosing agent, that calculates a temperature differential of the exhaust gas based on the downstream temperature, and that evaluates operation of the dosing system based on the temperature differential and the temperature differential threshold. Also described therein is a method of monitoring operation of a dosing system for treating exhaust gas of an engine, including the steps of: monitoring a downstream temperature of the exhaust gas downstream of the dosing system; injecting a dosing agent in to the exhaust gas; determining a temperature differential threshold based on an amount of the dosing agent; calculating a temperature differential of the exhaust gas based on the downstream temperature, and evaluating operation of the dosing system based on the temperature differential and the temperature differential threshold.

Moreover, in engines without exhaust gas recirculation (EGR) system that are adjusted to a very high $NO_x$ raw emission level (8-12 g/kWh $NO_x$) while minimizing the engine particulate matter emission, such adjustment allows the Tier4 (final) and EU Stage IV emissions regulations to be complied with by reducing the $NO_x$, HC and CO emissions by way of exhaust-gas aftertreatment alone. However, due to the high $NO_x$ levels in the raw emissions of the engine, the exhaust gas aftertreatment system is required to have a very high NOx removal efficiency of at least 97% $NO_x$ conversion.

SUMMARY OF THE INVENTION

It is expected that with the Tier5/EU Stage V emission standards, the allowable particulate emissions will no longer be limited in terms of the allowable particulate matter mass, but in terms of the allowable number of particles. As a result of this change in the legislation on exhaust emissions, engines emitting lower levels of particulate matter will also have to be equipped with diesel particulate filters in future. In particular for engines without EGR, it is an object of the present invention to find ways to integrate a diesel particulate filter into an exhaust gas aftertreatment system having high NOx removal efficiency.

It is an object of the present invention to provide a method for purifying diesel engine exhaust gases containing hydrocarbons, carbon monoxide, soot particles, and nitrogen oxides consisting of NO and $NO_2$, the method including the following steps in the direction of the exhaust gas flow:

a.) introducing into the exhaust gas to be cleaned ammonia or a precursor compound capable of decomposing to liberate ammonia under operating conditions;

b.) passing the exhaust gas resulting from a.) through a first SCR catalyst under conditions effective for converting less than or at most 50% of the nitrogen oxides that are present in the exhaust gas upstream of the first SCR catalyst into nitrogen;

c.) passing the exhaust gas resulting from b.) through a catalytically activated particulate filter, in which soot particles are collected and at least partially oxidized with $NO_2$ and/or $O_2$ present in the exhaust gas;

d.) introducing into the exhaust gas resulting from c.) ammonia or a precursor compound capable of decomposing to liberate ammonia under operating conditions;

e.) passing the exhaust gas resulting from d.) through a second SCR catalyst under conditions effective for converting substantially all of the nitrogen oxides present upstream of the second SCR catalyst into nitrogen.

The present invention provides an exhaust gas aftertreatment system for carrying out the method of the present invention, the system including in the direction of the exhaust gas flow in this order:

a.) a first device for introducing ammonia or a precursor compound capable of decomposing to liberate ammonia under operating conditions;
b.) a first SCR catalyst;
c.) a catalytically activated particulate filter;
d.) a second device for introducing ammonia or a precursor compound capable of decomposing to liberate ammonia under operating conditions;
e.) a second SCR catalyst.

The method of the present invention can be carried out in an exhaust gas aftertreatment system according to the present invention and enables conversion into harmless nitrogen of at least 97% of the nitrogen oxides present in the exhaust gas to be cleaned, while at the same time limiting the number of particles emitted from the tailpipe to such an extent that the upcoming particle count limits can be met. It is important to the overall function of the system that the NOx removal efficiency of the first SCR stage be limited to at most 50% of the nitrogen oxides present in the exhaust gas to be cleaned. This is the way to ensure that the catalytically activated particulate filter can be regenerated in step c.) by the residual nitrogen oxide remaining in the exhaust gas after passage through the first SCR catalyst through passive regeneration (based on what is known as the "CRT® effect"; i.e., burning off of deposited soot particles with $NO_2$ at suitable operating points), and that it does not clog during operation.

In the first SCR catalyst, in addition to the conversion of at most 50% of the nitrogen oxides contained in the exhaust gas to be cleaned, the hydrocarbons (HC) contained in the exhaust gas to be cleaned and/or the carbon monoxide (CO) contained in the exhaust gas to be cleaned is/are at least partially converted into carbon dioxide ($CO_2$). To this end, it is preferred to use SCR catalysts that have a certain oxidation function with respect to HC and CO, exhibit sufficient stability to thermal aging, and are resistant to (partial) poisoning by hydrocarbons. Such SCR catalysts preferably contain one or more compounds selected from the group consisting of vanadium oxide, titanium oxide, tungsten oxide, cerium oxide, lanthanum oxide, iron oxide, and aluminum oxide. Also suitable are SCR catalysts which contain SCR catalytically active coatings based on small-pore zeolites or zeolite-like compounds, and which are unable to (reversibly) store hydrocarbons in the coating.

The SCR catalyst for this first NOx removal stage is to be selected to provide sufficient $NO_x$ conversion rates even at low levels of $NO_2$ in the exhaust gas entering the catalyst. This criterion is generally fulfilled when using the catalysts mentioned above.

Upon passage through the first SCR catalyst, the exhaust gas to be cleaned is passed through a catalytically active particulate filter in order to remove the soot particles contained in the exhaust gas. Moreover, preferably, hydrocarbons and/or carbon monoxide which, on the one hand, may come from the exhaust gas to be cleaned and have not been converted into $CO_2$ in the upstream SCR catalyst, or which, on the other hand, may have formed as a secondary emission from burning off soot during the regeneration of the particulate filter, are at least partially oxidized to $CO_2$ in this catalytically activated particulate filter. Particularly preferably, nitrogen monoxide (NO) from the exhaust gas or from the oxidation of soot particles with $NO_2$ in the catalytically active particulate filter is also at least partially oxidized to $NO_2$, so that the exhaust gas resulting from step c.) exhibits an $NO_2/NO_x$ ratio of between 0.3 and 0.8. Even more preferably, the exhaust gas resulting from step c.) exhibits an $NO_2/NO_x$ ratio of between 0.4 and 0.6.

For this purpose, it is preferred to use a particulate filter including a wall flow filter substrate and an oxidation-catalytically active coating that contains one or more noble metals selected from the group consisting of platinum, palladium and rhodium. This oxidation-catalytically active coating is preferably present in the channel walls of the wall flow filter substrate between the inlet and outlet channels. Such an arrangement ensures that substantial portions of the exhaust gas to be cleaned will not get into contact with the oxidation-catalytically active coating until the particles are separated out. This has the advantage firstly that $NO_2$ formed from NO by contact with the oxidation-catalytically active coating is no longer consumed by the passive burning off of soot based on the CRT® effect and is consequently available for subsequent steps, especially for the SCR reaction in the downstream second SCR stage. Secondly, such an arrangement of the oxidation-catalytically active coating in the wall flow filter substrate ensures that oxidizable secondary emissions, such as CO and hydrocarbons, which may be formed in the inlet channels during particulate filter regeneration, can be oxidized to harmless $CO_2$ as the exhaust gas passes through the wall into the outlet channels.

To ensure adequate particulate filter regeneration rates, it may be particularly preferred for the catalytically activated particulate filter to further contain a coating zone which is deposited on the channel walls in the inlet channels on the inflow side and extends over 10-50% of the length of the filter and includes a further oxidation-catalytically active coating containing one or more noble metals selected from the group consisting of platinum, palladium and rhodium. As the exhaust gas entering the catalytically activated particulate filter contacts this oxidation-catalytically active coating, nitrogen monoxide (NO) contained, inter alia, in the exhaust gas is at least partially oxidized to $NO_2$. The $NO_2$ so formed can then be used in the particulate filter to burn off soot, thereby promoting the passive regeneration of the filter.

Since the (secondary) formation of $NO_2$, which is required to regenerate the particulate filter, often occurs at lower yields in a zone contained in the particulate filter on the inflow side than when providing the $NO_2$ in the exhaust gas prior to entry into the particulate filter, it is part of the preferred embodiments of the method of the present invention that prior to entry into the catalytically active particulate filter, the exhaust gas resulting from step b.) is passed through a diesel oxidation catalyst effective for at least partially oxidizing hydrocarbons and carbon monoxide contained in the exhaust gas to $CO_2$, and for at least partially oxidizing NO contained in the exhaust gas to $NO_2$. In this case, a diesel oxidation catalyst is positioned between the first SCR catalyst and the catalytically activated particulate filter. However, particularly preferably, the diesel oxidation catalyst is provided as a coating zone on the first SCR catalyst on the outflow side, which allows for space savings.

In accordance with the present invention, upon passage through the catalytically activated particulate filter, ammonia or a precursor compound capable of decomposing into ammonia under operating conditions is introduced into the exhaust gas again. Then, the resulting exhaust gas is passed through a second SCR catalyst under conditions effective for converting substantially all of the nitrogen oxides present upstream of the second SCR catalyst into nitrogen.

The second SCR catalyst has to be designed to provide the highest possible NOx reduction rates, because at least 50% of the nitrogen oxides originally present in the exhaust gas is still contained in the exhaust gas to be cleaned when it enters this second SCR catalyst. It may be required for the second SCR catalyst to have a larger volume than the first SCR catalyst.

Preferably, the second catalyst includes one or more compounds selected from the group of transition metal-exchanged zeolites and/or transition metal-exchanged zeolite-like compounds. Particularly preferably, the transition metals are selected from the group consisting of iron, copper, cobalt, nickel and cerium. Particularly preferably, the zeolites and/or the zeolite-like compounds are selected from the group consisting of Beta zeolite, ZSM-5, SAPO and ALPO.

Preferably, when carrying out the method of the present invention, in particular in step d.), ammonia or the compound capable of decomposing into ammonia under operating conditions is added in an amount selected such that at the point of entry into the SCR catalyst, the ammonia used as a reductant for nitrogen oxides is present in a superstoichiometric ratio relative to the nitrogen oxides to be reduced. This ensures that the conversion of the SCR reaction occurring in the second SCR catalyst is not limited by lack of reductant.

To prevent ammonia, which is also a noxious gas, from being released into the atmosphere in such a process, the exhaust gas resulting from e.) is passed through an ammonia-oxidizing catalyst under conditions effective for at least partially oxidizing ammonia to nitrogen. In the exhaust gas aftertreatment system of the present invention for carrying out the inventive method, such an ammonia-oxidizing catalyst is positioned downstream of the second SCR catalyst. Particularly preferably, the ammonia-oxidizing catalyst is provided as a coating zone on the second SCR catalyst on the outflow side.

The method according to the present invention and the exhaust gas aftertreatment system of the present invention allow in particular exhaust gases of diesel engines without exhaust gas recirculation, which contain high levels of nitrogen oxide in addition to hydrocarbons, carbon monoxides, and particulate matter, to be cleaned to an extent that makes it possible to comply with the more stringent emission limits expected in the future and, at the same time, to comply with the expected particle count limits. The exhaust gas aftertreatment system of the present invention uses a limited number of emission control devices for this purpose. Moreover, despite the introduction of the particulate filter, such a system, when suitably designed, does not occupy more space than the high-efficiency (i.e., generally multi-stage) SCR systems that are used today for engines without exhaust gas recirculation.

BRIEF DESCRIPTION OF THE DRAWINGS

The present invention will now be explained with reference to several examples and figures.

DETAILED DESCRIPTION

Example 1

Figure 1:
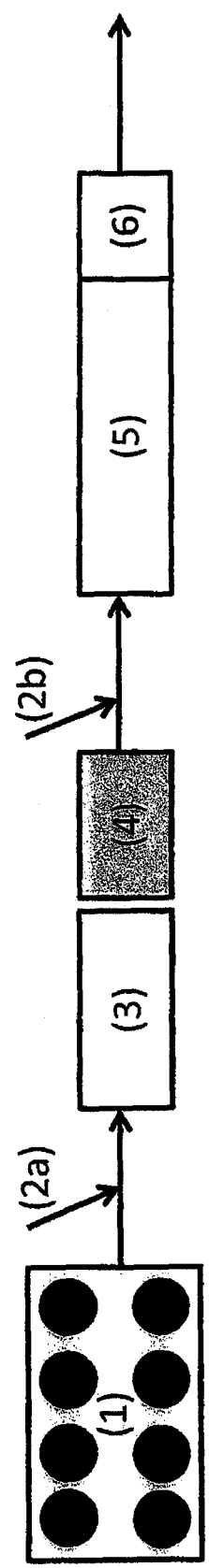
FIG. 1 shows schematically an exhaust gas aftertreatment system according to an embodiment of the present invention.

An exhaust gas aftertreatment system, as shown schematically in FIG. 1, was set up for purifying the exhaust gas from a V-8 diesel engine (1) having a displacement of 16 L and a power output of 520 kW. The engine was adjusted such that the raw emissions of the engine at the entry to the exhaust gas aftertreatment system contained 10 g/kWh NOx and 18 mg/kWh particulate matter.

First, a urea-water solution (UWS) was fed (2a) into the exhaust gas exiting the engine as a precursor compound capable of decomposing to liberate ammonia under operating conditions. Then, the exhaust gas was passed through a first SCR catalyst (3) having a volume of 26 L. This catalyst contained vanadium oxide-tungsten oxide-titanium oxide as a catalytically active component and, at a space velocity of about 90,000 1/h at the rated power output, exhibited a $NO_x$ conversion of less than 50% of the nitrogen oxides present in the raw emission.

Figure 4:
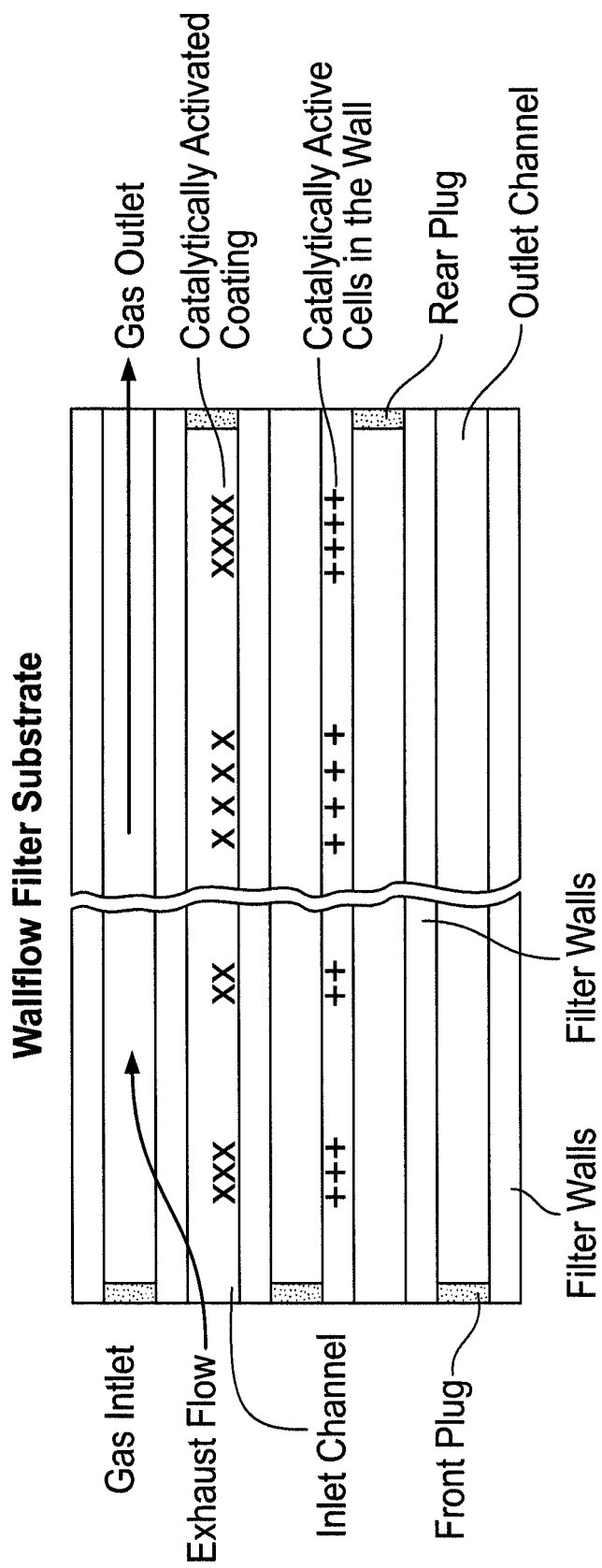
FIG. 4 shows schematically a wall flow filter substrate of a catalytically activated particulate filter including an oxidation-catalytically active coating in walls between inlet and outlet channels and another oxidation-catalytically active coating applied to walls in the inlet channels on an inflow side.

Upon passage through this first SCR catalyst, the exhaust gas was passed through a catalytically activated particulate filter (4) containing a wall flow filter substrate where an oxidation-catalytically active coating containing 2 g of platinum as a catalytically active component was incorporated in the walls between the inlet and outlet channels (see, e.g., FIG. 4).

Upon passage through the particulate filter, UWS was fed (2b) into the exhaust gas again, and the exhaust gas was passed through a second SCR catalyst. The second SCR catalyst (5) had a total volume of 35 L and contained an iron-exchanged zeolite compound as a catalytically active component. A highly selective ammonia-oxidizing catalyst (ASC) (6) was contained in the total volume of the second SCR catalyst as a coating zone deposited on the outflow side. The length of the ASC zone on the outflow side was about 25% of the overall length of the second SCR catalyst. This zone contains 0.88 g of platinum as an oxidation-active component.

A measurement of the emissions in the exhaust gas exiting the catalytically activated particulate filter showed that the exhaust gas exiting the catalytically activated particulate filter contained less than 5 g/kWh CO and less than 0.19 g/kWh HC. Moreover, it turned out that the exhaust gas exiting the catalytically activated particulate filter exhibited an $NO_2/NO_x$ ratio of between 0.25 and 0.55, depending on the operating point of the engine.

A second exhaust-gas measurement in the tailpipe after passage through the second SCR catalyst showed that the NO limit of 0.4 g/kWh was also met. The observed ammonia concentrations in the tailpipe did not exceed 10 vppm on average over time.

A measurement of the number of particles showed that the expected particle count limit of $10^{12}$/kWh was also met.

However, the observed regeneration performance of the particulate filter proved suboptimal. Therefore, in an application of this system, an active regeneration of the particulate filter is provided. This may preferably be accomplished using a catalytic burner, such as is described in U.S. Publication No. 2012/0117949 (also published as WO 2010139429 and DE 10 2009 023 550), which is incorporated by reference herein. Since, in the chosen embodiment, the first SCR catalyst exhibits both good oxidation performance for gaseous hydrocarbons and good thermal stability, no additional, upstream diesel oxidation catalyst is needed for the operation of the regeneration process.

Example 2

Figure 2:
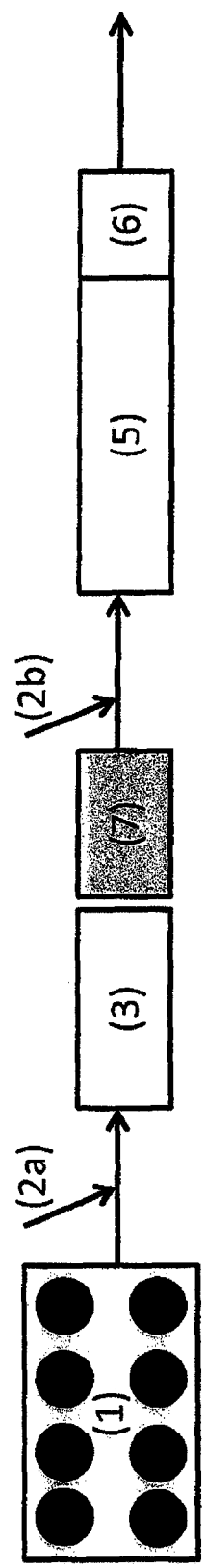
FIG. 2 shows schematically an exhaust gas aftertreatment system according to another embodiment of the present invention.

In the system of FIG. 1, the catalytically active particulate filter (4) was replaced by another catalytically activated particulate filter (7) which, as shown schematically in FIG. 4, in addition to the oxidation-catalytically active coating in the walls between the inlet and outlet channels, contained another oxidation-catalytically active coating, which had been applied to the walls in the inlet channels on the inflow side. FIG. 2 shows this embodiment of the exhaust gas aftertreatment system of the present invention in schematic form. The oxidation-catalytically active coating contained in the filter on the inflow side extended over 50% of the overall length of the wall flow filter substrate and contained 0.88 g of platinum.

Exhaust-gas measurements performed in this system showed that after passage of the exhaust gas through the particulate filter and prior to the subsequent introducing of UWS, the exhaust gas exhibited an $NO_2/NO_x$ ratio of between 0.35 and 0.6, depending on the operating point of the engine. A further measurement at the tailpipe showed that this system was also capable of reliably meeting the emission limits already mentioned in Example 1.

In addition, as compared to Example 1, this system exhibited a lower balance point temperature, which is equivalent to improved passive regeneration performance of the particulate filter.

Example 3

In a further test, the system of Example 1 was modified as follows:

The first SCR catalyst having a volume of 26 L was replaced by a component which had the same volume, but which contained an SCR-active catalytic coating (3') with vanadium oxide-tungsten oxide-titanium oxide as a catalytically active component only over the upstream ⅔ of its length. The downstream third of the component had been provided with a diesel oxidation catalyst coating (8) containing 4 g of platinum as a catalytically active component.

Since the SCR catalyst volume provided in the first stage was 33.3% smaller than in Example 1, a second SCR catalyst (5') was used which had a total volume of 43.5 L and also included an ASC coating zone (6) on the outflow side. The deposited ASC zone had the same volume as that in Example 1 and also contained 0.88 g of platinum as an oxidation-active component.

Figure 3:
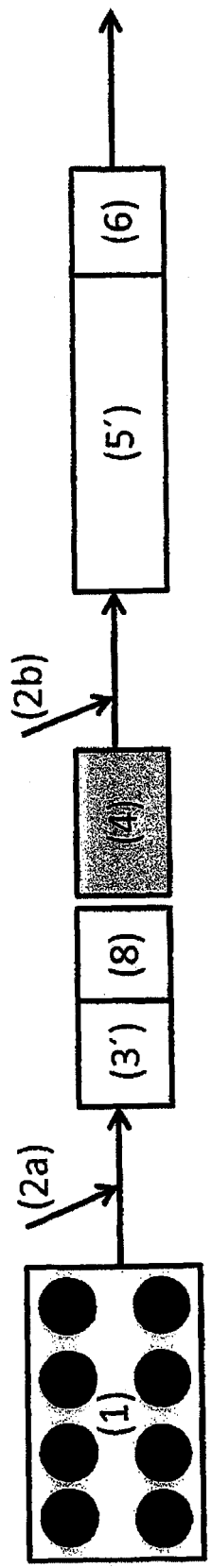
FIG. 3 shows schematically an exhaust gas aftertreatment system according to yet another embodiment of the present invention.

The system used in shown schematically in FIG. 3.

As in the preceding examples, the exhaust-gas measurements in the tailpipe also showed here that compliance with the emission limits already indicated in Example 1 could be reliably achieved. Furthermore, this system exhibited an even lower balance point temperature compared to Example 2. Moreover, the residual CO and HC emissions actually detected in the tailpipe were lower than in examples 1 and 2.

What is claimed is:

1. A method for purifying diesel engine exhaust gases containing hydrocarbons, carbon monoxide, soot particles, and nitrogen oxides consisting of NO and $NO_2$, the method comprising the following steps in the direction of the exhaust gas flow:
   a.) introducing into the exhaust gas to be cleaned ammonia or a precursor compound capable of decomposing to liberate ammonia under operating conditions;
   b.) passing the exhaust gas resulting from a.) through a first SCR catalyst under conditions effective for converting less than or at most 50% of the nitrogen oxides that are present in the exhaust gas upstream of the first SCR catalyst into nitrogen;
   c.) passing the exhaust gas resulting from b.) through a catalytically activated particulate filter, in which soot particles are collected and at least partially oxidized with $NO_2$ and/or $O_2$ present in the exhaust gas;
   d.) introducing into the exhaust gas resulting from c.) ammonia or a precursor compound capable of decomposing to liberate ammonia under operating conditions;
   e.) passing the exhaust gas resulting from d.) through a second SCR catalyst under conditions effective for converting substantially all of the nitrogen oxides present upstream of the second SCR catalyst into nitrogen.

2. The method as recited in claim 1 wherein hydrocarbons and carbon monoxides contained in the exhaust gas are at least partially converted into CO and/or $CO_2$ in the first SCR catalyst.

3. The method as recited in claim 1 wherein hydrocarbons and/or carbon monoxide from the exhaust gas and/or from the oxidation of soot particles in the catalytically activated particulate filter are at least partially oxidized to $CO_2$.

4. The method as recited in claim 1 wherein NO from the exhaust gas and/or from the oxidation of soot particles with $NO_2$ in the catalytically activated particulate filter is at least partially oxidized to $NO_2$, so that the exhaust gas resulting from e.) exhibits an $NO_2/NOx$ ratio of between 0.3 and 0.8.

5. The method as recited in claim 1 wherein the exhaust gas resulting from e.) is passed through an ammonia-oxidizing catalyst under conditions effective for at least partially oxidizing ammonia to nitrogen.

6. The method as recited in claim 1 wherein prior to entry into the catalytically active particulate filter, the exhaust gas resulting from b.) is passed through a diesel oxidation catalyst effective for at least partially oxidizing hydrocarbons and carbon monoxide contained in the exhaust gas to $CO_2$, and for at least partially oxidizing NO contained in the exhaust gas to $NO_2$.

* * * * *